No. 723,279. PATENTED MAR. 24, 1903.
W. E. JAQUES.
MAKING GLAZED BRICKS.
APPLICATION FILED APR. 10, 1902.
NO MODEL.
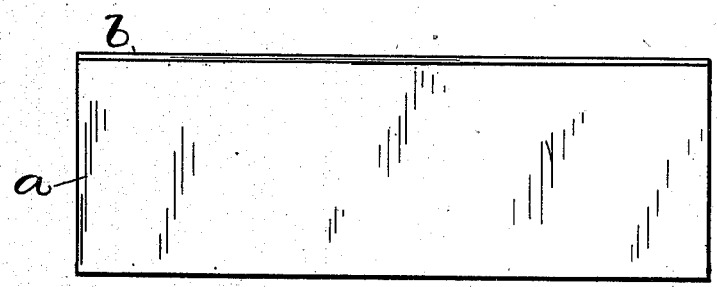
WITNESSES:
Daniel E Daly.
Victor C. Lynch.
INVENTOR
William E. Jaques.
BY
ATTORNEYS

UNITED STATES PATENT OFFICE.

WILLIAM E. JAQUES, OF GRAND RAPIDS, MICHIGAN, ASSIGNOR TO ALFRED O. CROZIER, OF GRAND RAPIDS, MICHIGAN.

MAKING GLAZED BRICKS.

SPECIFICATION forming part of Letters Patent No. 723,279, dated March 24, 1903.

Application filed April 10, 1902. Serial No. 102,205. (No model.)

*To all whom it may concern:*

Be it known that I, WILLIAM E. JAQUES, a citizen of the United States of America, residing at Grand Rapids, in the county of Kent and State of Michigan, have invented certain new and useful Improvements in Making Glazed Bricks; and I hereby declare the following to be a full, clear, and exact description of the invention, such as will enable others skilled in the art to which it pertains to make and use the same.

This invention relates to improvements in the art of making glazed bricks, and pertains more especially to the manufacture of a brick whose body portion is composed of cement or cementitious material and which has a glazed or vitreous facing.

The primary object of this invention is to make a cement brick with a permanent, inexpensive, and durable vitreous face.

The accompanying drawing is a side elevation of a glazed brick made according to my invention.

Referring to the drawing, *a* designates the body portion of the brick, which is composed, preferably, of cement or cementitious material and has a glazed or vitreous facing *b*. In other words, that part of the body portion upon which the glazed face is formed is composed, preferably, of cement or cementitious material—such, for instance, as any compound or material having Portland or hydraulic cement as an ingredient.

In carrying out my invention the body portion *a* of the brick is formed in any approved manner, whereupon a layer of the semiliquid compound or mixture suitable for the formation of the glazed facing is applied and spread upon the said body portion. The facing-forming layer *b* is composed, preferably, of a mixture or compound having as ingredients the following materials: silica or silicates in a granular or finely-divided state—such, for instance, as common sand and clay; Portland or hydraulic cement; a flux—such, for instance, as lime and sodium; water, and a coloring substance—such, for instance, as any metallic oxid. The said mixture or compound is made, preferably, by first mixing together the cement and the silica or silicate in a dry state and making a solution of water, flux, and metallic oxid and mixing this solution with the dry mixture of cement and silica or silicate and thoroughly stirring or mixing the said ingredients together, and the resulting mixture or compound is then applied to the facing-receiving surface of the body portion of the brick by spreading the same in a thin layer on the said surface, whereupon the facing-forming layer is permitted to set and dry upon the said body portion and then fired in a kiln to fuse and glaze and to unite the same permanently to the body portion of the brick.

The preferred proportions of the ingredients measured by volume are seventy-five per cent. of silica or silicate, seven per cent. of cement, five per cent. of flux, one per cent. of metallic oxid, and twelve per cent. of water.

The cement as an ingredient is advantageous in that it not only participates in uniting the facing-forming layer to the body portion of the brick, but binds together the particles of the said layer and holds the layer in place while burning in the kiln.

A glazed cement brick made according to my invention has a comparatively inexpensive vitreous facing which is permanently united to the body portion of the brick and is not liable to become crazed or impaired by exposure to the weather.

What I claim is—

1. An improvement in the art of making a glazed cement or cementitious brick consisting in forming the body portion of the brick of cement or cementitious material and providing such body portion externally with a layer of a mixture or compound comprising a silica or silicate, cement, a flux and water or moisture as ingredients, then permitting the said layer to set, and then burning or firing the same in a kiln.

2. An improvement in the art of making a glazed cement or cementitious brick, consisting in forming the body portion of the brick of cement or cementitious material; then applying, to the facing-receiving surface of the body portion, a layer of a mixture or compound comprising a silica or silicate, cement, a flux and water or moisture as ingredients; then permitting the said layer to set and dry, and then burning or firing the same in a kiln.

3. An improvement in the art of making a glazed cement or cementitious brick consisting in forming the body portion of the brick of cement or cementitious material, and providing the said body portion externally with a layer of a mixture or compound comprising a solution of flux and a metallic oxid mixed or compounded with a dry mixture of cement and silica or silicate.

In testimony whereof I sign the foregoing specification, in the presence of two witnesses, this 20th day of January, 1902, at Cleveland, Ohio.

WILLIAM E. JAQUES.

Witnesses:
TELSA SCHWARTZ,
VICTOR C. LYNCH.